July 19, 1966 S. BARTH 3,261,531
CONTAINER HOLDER AND TRAY
Filed April 28, 1965 3 Sheets-Sheet 1

INVENTOR.
STANLEY BARTH
BY
ATTORNEYS

July 19, 1966  S. BARTH  3,261,531
CONTAINER HOLDER AND TRAY
Filed April 28, 1965  3 Sheets-Sheet 2
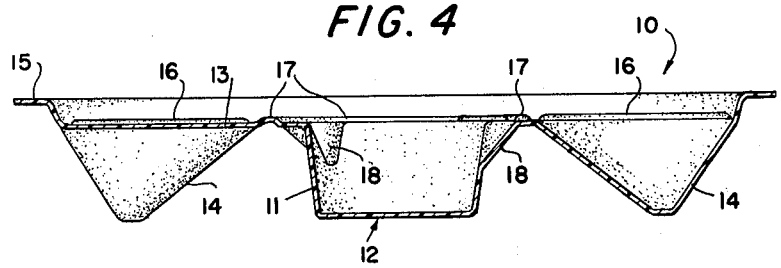
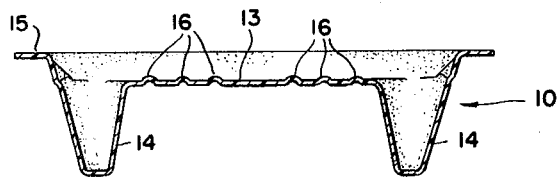
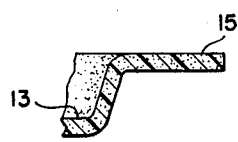
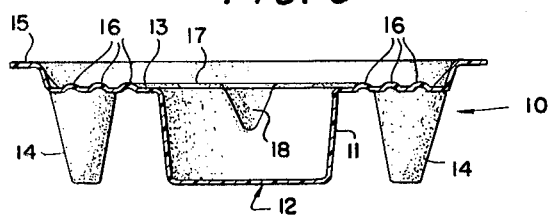
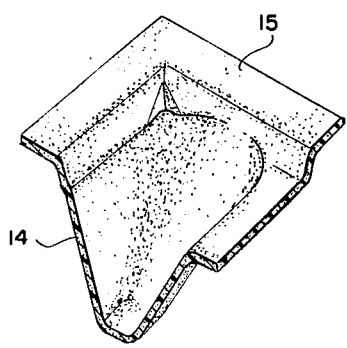
INVENTOR.
STANLEY BARTH
BY
ATTORNEYS July 19, 1966  S. BARTH  3,261,531
CONTAINER HOLDER AND TRAY
Filed April 28, 1965  3 Sheets-Sheet 3

INVENTOR.
STANLEY BARTH

BY
ATTORNEYS

United States Patent Office 3,261,531
Patented July 19, 1966

3,261,531
CONTAINER HOLDER AND TRAY
Stanley Barth, 7 Park Ave., New York, N.Y.
Filed Apr. 28, 1965, Ser. No. 451,438
10 Claims. (Cl. 229—2.5)

This application is a continuation-in-part of the copending application of Stanley Barth, Serial No. 301,742, filed August 13, 1963, now abandoned.

The invention relates to a novel integrally formed and contoured container holder and tray.

The container holder and tray of the present invention includes a tray or dish having a centrally located cup-like receptacle therein which depends from the bottom of the tray and serves as a handle which can be grasped around the outer periphery with one hand. The cup-like receptacle also serves to receive and support therein the base or lower end of a beverage container, such as a glass or paper container, soda bottle, beer can or the like, to support the beverage container in upright condition and prevent it from being upset in the event that the user is jostled in a crowd. At the same time, food and other comestibles can be carried on the tray. As the container holder and tray is carried in one hand, the food and beverage can be removed therefrom for consumption with the free hand of the user.

The container holder and tray is particularly suited for carrying food and a beverage served or purchased at parties, picnics, fairs, amusement parks, street stands, and other places where there are no facilities or inadequate facilities for table service. By making the container holder and tray of an inexpensive material, the container and tray can be disposed of after use. In addition, it is made from integrally formed and contoured sheet-like material in which the underside of one article in a stack is nestable with the complementary shaped upper side of the article below.

A particular feature of the container holder and tray of the present invention is that it is provided with a plurality of leg-like formations depending from the base of the tray so that the container holder and tray can be placed on a supporting surface without danger that the tray will be upset even though the food may be unevenly distributed on the tray. These tray supporting formations are spaced apart from the depending receptacle so that they do not interfere with access to the receptable when the tray is at rest and is to be lifted or prevent withdrawal of the user's hand from beneath the tray when the tray is placed on a supporting surface. In one embodiment of the present invention, the depending leg-like formations provide useful wells or compartments in the upper surface of the tray. In another embodiment, they are depending extensions from the outer periphery of the tray.

For a complete understanding of the present invention, reference can be made to the detailed description which follows and to the accompanying drawings in which.

Figure 1:
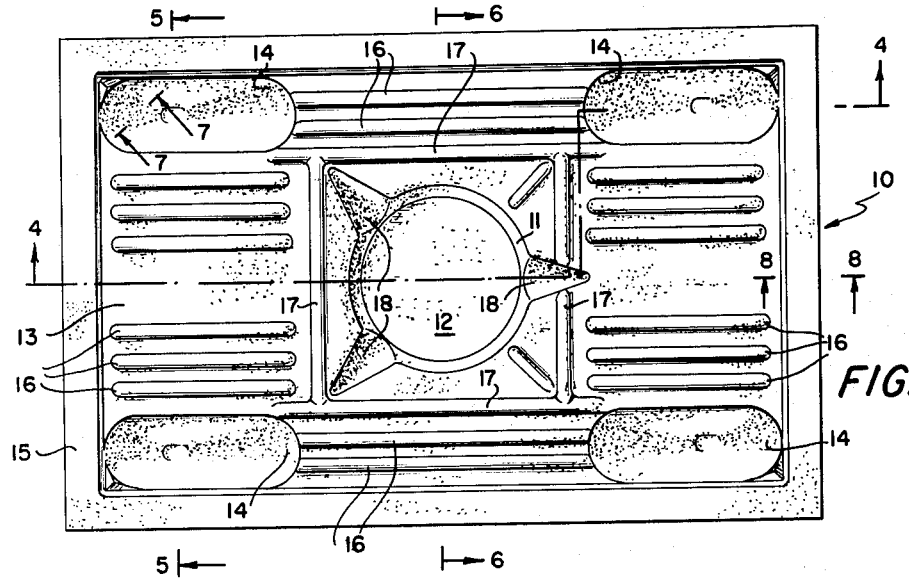
FIG. 1 is a top plan view of the container holder and tray of the present invention.
Figure 2:
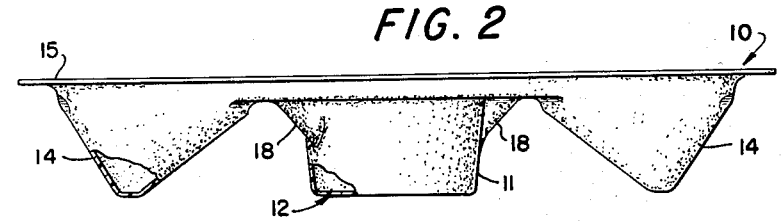
FIG. 2 is an end view thereof having portions broken away.
Figure 3:
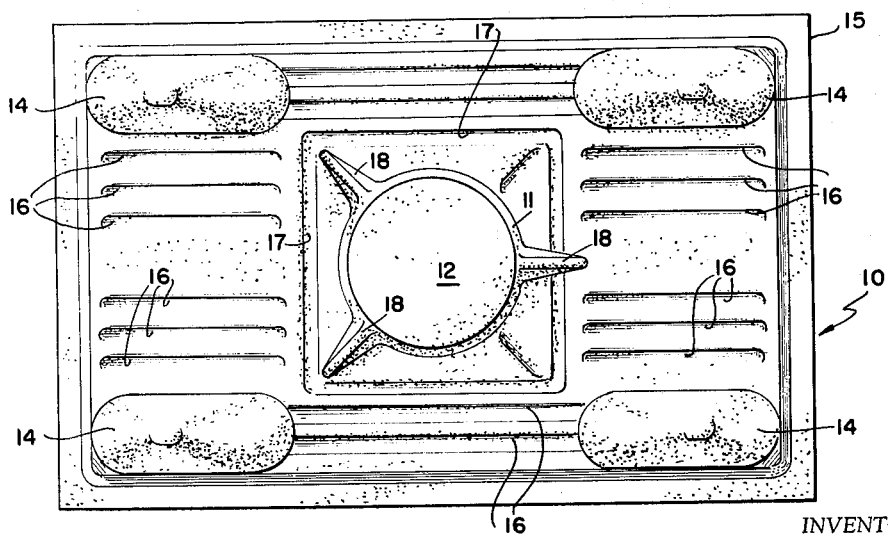
FIG. 3 is a bottom view.
Figure 9:
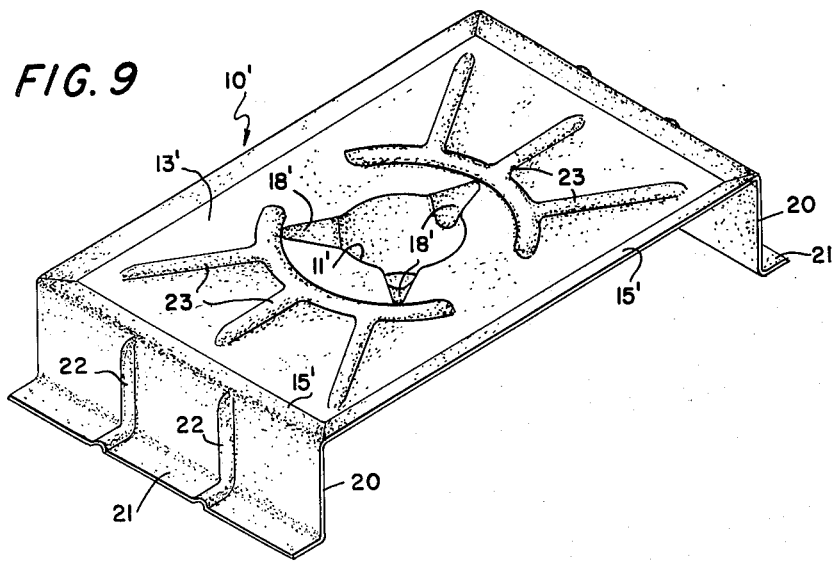
Figure 10:
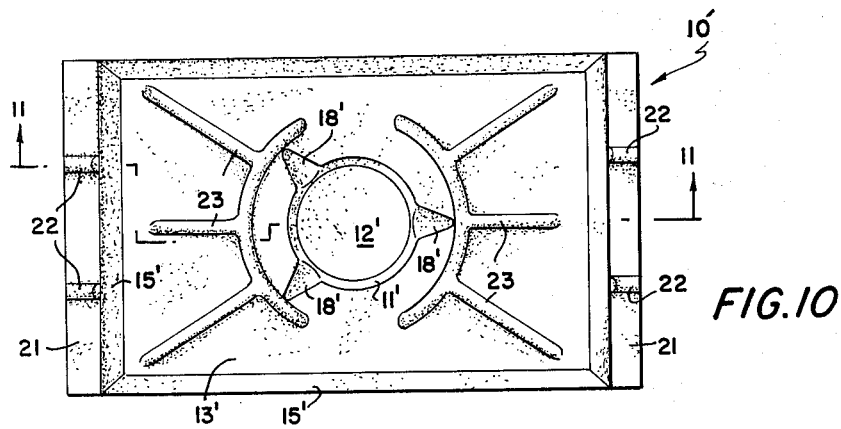

FIGS. 4, 5, 6, 7 and 8 are sectional views taken along lines 4—4, 5—5, 6—6, 7—7 and 8—8 of FIG. 1, looking in the direction of the arrows;

FIG. 9 is a perspective view of an alternative embodiment of the container holder and tray of the present invention;

FIG. 10 is a plan view of the form of the article as shown in FIG. 9; and

Figure 11:
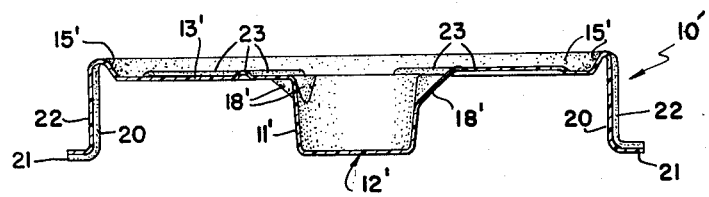

FIG. 11 is a sectional view taken along the line 11—11 of FIG. 10, looking in the direction of the arrows.

Referring to the drawings, the container holder and tray, generally designated as 10, is integrally formed and contoured by pressing or molding sheet-like material of substantially uniform thickness. The holder and tray includes a cup-like receptacle 11 having a flat base 12 for receiving therein the base of a container for a beverage and maintaining it in upright position, a tray portion 13 extending outwardly from the upper end of the cup-like receptacle, and a plurality of depending leg-like formations 14 which together with the base 12 of the receptacle, support the holder and tray when it is placed on a supporting surface. The holder is preferably disposable and formed or molded in one piece of a light weight, inexpensive, insulated material, such as polystyrene foam. However, it can also be made of relatively rigid paperboard, plastic or other material if it is to be disposable, or it can be made of metal or more expensive materials if it is to be reused.

The receptacle 11 is located at the center of the tray, and the lower end of the receptacle depends from the bottom of the tray so that it can be conveniently grasped and carried in one hand. The receptacle is also sufficiently deep to accommodate the base of a container, bottle, can, glass or cup in upright position and prevent it from being knocked over or upset if the user is jostled in a crowd, but it is nevertheless shallow enough so that the upper end of the container extends substantially above the dish or tray 11 to permit it to be readily grasped and removed from the receptacle for consumption by the user. Also, the receptacle 11 should be of a shape substantially complementary to the shape of the container with the tolerance between the receptacle and the beverage container sufficiently close to permit the container to be held in upright position without impeding its removal from or entry into the receptacle. The rigidity of the receptacle 11 should also be sufficient to permit the container holder and tray to be firmly grasped around the outer surface of the receptacle, whether or not the beverage container is accommodated therein.

The upper surface of the tray 13 is substantially perpendicular to the axis of the receptacle 11 so that when the receptacle is carried in upright position the upper surface of the tray will extend substantially horizontally. An outer, upwardly turned rim 15 extends around the outer periphery of the tray.

The tray, in the form shown in the drawings, is rectangular in shape and has a plurality of parallel formations 16 therein which produce ribs on the upper surface thereof to enhance the appearance and also to help keep the food in proper place on the tray. It is understood however, that the tray could be of different shape and, if desired, be subdivided into a plurality of separate food compartments.

In the holder and tray shown in the drawings, there is a depending leg-like formation 14 at each corner of the tray. The depth of each of these leg-like formations is preferably the same as the depth of the receptacle 11 so that when the tray is placed on a supporting surface it will be supported by the flat base 12 of the receptacle 11 and by the lower ends of the depending formations 14. These depending formations 14 provide wells or cavities at each of the four corners of the tray in which various things, such as ketchup, mustard and other sauces, can be carried.

The receptacle 11 for carrying the beverage container is separated from the food-carrying areas of the tray by a rectangular upstanding rib 17 which frames the receptacle.

A plurality of radial grooves 18 are formed in the walls forming the upper end of the cup-like receptacle 11 and the inner periphery of the tray portion 13 to reinforce the tray. These grooves extend from the wall defining the receptacle 11 at a point intermediate the upper and lower ends of the receptacle to the tray portion 13 at a point spaced apart from the upper end of the receptacle.

The container holder and tray described above can be conveniently handled and packed in large quantities because they nest when stacked.

In use, a beverage container is placed within the receptacle and foods or other items to be carried are placed on the tray or in the wells of the depending formations 14. The tray can be conveniently carried in one hand by grasping the outer periphery of the depending receptacle 11, leaving the other hand free to handle the beverage container and the items carried on the tray.

In the embodiment shown in FIGURES 9 through 11, the container holder and tray 10' includes a cup-like receptacle 11' having a flat base, a rectangular tray portion 13' extending outwardly from the upper end of the cup-like receptacle, reinforcing grooves 18 extending from the wall of the receptacle to the tray portion, and a plurality of depending leg formations 20 formed integrally with and depending from opposite sides of the tray. The depending leg formations 20 taper slightly outwardly at the bottom to permit the articles to nest closely together when stacked. The lower ends of the leg formations have outwardly turned foot-like flanges 21 which cooperate with the base of the receptacle 11' to support the container holder and tray on a surface without danger of the tray tilting or upsetting due to an unbalanced distribution of weight thereon.

The tray 13' preferably has an upwardly turned rim 15' around the outer periphery thereof and the depending leg formations 20 are connected integrally with the rim on opposite sides of the tray. Vertically extending reinforcing ribs 22 are formed in the leg formations 20, and if desired, ribs 23 can be formed in the tray surface.

The invention has been shown in preferred forms and by way of example only, and various modifications and variations can be made therein without departing from the spirit of the invention. The invention, therefore, should not be limited to any specific form or embodiment except insofar as such limitations are expressly set forth in the appended claims.

I claim:

1. An integrally formed and contoured holder of substantially sheet-like material comprising a relatively deep cup-like receptacle for receiving the base of a container for a beverage therein and maintaining it in upright position to prevent tipping, a food supporting tray portion having a food-supporting area substantially larger than the cup-like receptacle and extending outwardly from the upper end of the cup-like receptacle at a height substantially above the base of the receptacle, the outer surface of the receptacle being defined by a relatively rigid wall which extends downwardly a substantial distance below the tray so that the receptacle can be grasped by the user by one hand partially encircling the periphery of the outer wall of the receptacle to carry the tray and contents in one hand, and a plurality of leg formations depending from the base of the tray and spaced apart from the receptacle so as not to interfere with the grasping of the receptacle by the user around the periphery of the outer wall of the receptacle, said depending leg formations being of substantially the same depth and cooperating in supporting the tray on a supporting surface.

2. An integrally formed and contoured holder as set forth in claim 1 including a plurality of wells formed in the upper surface of the tray by the depending leg formations.

3. An integrally formed and contoured holder as set forth in claim 1 in which the depending leg formations are depending extensions of the outer periphery of the tray.

4. An integrally formed and contoured disposable holder of substantially sheet-like polystyrene foam material comprising a cup-like receptacle for receiving the base of a container for a beverage therein and maintaining it in upright position, a food supporting tray portion extending outwardly from the upper end of the cup-like receptacle at a height substantially above the base of the receptacle, the food-supporting tray being of substantially greater area than the cup-like receptacle, the outer surface of the receptacle being defined by a relatively rigid wall which extends downwardly a substantial distance from the food-supporting tray, the distance being sufficient to permit the user to grasp the outer wall of the receptacle by one hand partially encircling the outer wall to carry the entire tray and contents with one hand, a plurality of leg formations depending from the base of the tray and spaced apart from the receptacle so as not to interfere with the grasping of the outer wall of the receptacle by the user when the tray is at rest on the flat supporting surface, said depending leg formations being of substantially the same depth as the cup-like receptacle so that the leg formations and the base of the cup-like receptacle cooperate in supporting the tray on a supporting surface, and a plurality of wells formed in the upper surface of the tray by the depending leg formations.

5. An integrally formed and contoured disposable holder of substantially sheet-like material comprising a relatively deep cup-like container-receiving receptacle for receiving the base of a container for a beverage therein and maintaining it in upright position to avoid tipping of the container, a food-supporting tray portion of substantially greater area than the receptacle and extending outwardly from the upper end of the cup-like receptacle at a height substantially above the base of the receptacle so that the latter can be readily grasped and carried by the user when the holder is at rest on the flat supporting surface, a plurality of leg formations depending from the outer periphery of the tray and being of substantially the same height as the cup-like receptacle so that the leg formations and the base of the cup-like receptacle cooperate in supporting the tray on a supporting surface.

6. An integrally formed and contoured holder as set forth in claim 5 in which the depending formations taper outwardly from the top toward the bottom to facilitate nesting.

7. An integrally formed and contoured holder as set forth in claim 5 in which the tray is substantially rectangular and including an upwardly turned rim around the outer periphery of the tray, the depending leg formations being extensions of the rim at the opposite sides of the tray.

8. An integrally formed and contoured holder as set forth in claim 5 including vertically disposed ribs in the depending leg formations to reinforce the same.

9. An integrally formed and contoured holder as set forth in claim 5 including laterally extending foot-like formations at the lower ends of the leg formations.

10. An integrally formed and contoured holder of substantially sheet-like, relatively flexible material comprising a cup-like receptacle having a flat base for receiving the base of a container for a beverage therein and maintaining it in upright position, a food-supporting tray portion of substantially greater area than the receptacle and extending outwardly from and surrounding the upper end of the cup-like receptacle at a height substantially above the base of the receptacle so that the latter can be readily grasped when the cup-like receptacle is at rest on a flat supporting surface and either carried or placed in upright position on a supporting surface, and a plurality of radial reinforcing grooves formed integrally in the sheet-like material extending from the wall defining the receptacle at a point intermediate the upper and lower ends thereof to a point of the tray portion spaced apart from the upper end of the receptacle, the said grooves forming part of the receptacle wall and food-supporting surface of the tray, the holder being further characterized in that the upper surface thereof is the complement of the lower surface so that the holders nest when stacked.

(References on following page)

References Cited by the Examiner

UNITED STATES PATENTS

| | | |
|---|---|---|
| D. 170,237 | 8/1953 | Randall. |
| 1,943,698 | 1/1934 | Schurmann 229—2.5 |
| 1,979,911 | 11/1934 | Steudel 229—2.5 X |
| 2,195,442 | 4/1940 | Barney 229—215 |
| 3,128,029 | 4/1964 | Price et al. 229—2.5 X |
| 3,151,799 | 10/1964 | Engles et al. 229—2.5 |

GEORGE O. RALSTON, *Primary Examiner.*